(12) United States Patent
Van Gorkum

(10) Patent No.: US 7,827,065 B2
(45) Date of Patent: Nov. 2, 2010

(54) METHOD AND SYSTEM FOR SELLING AN ADDITIVE FOR A PRODUCT

(75) Inventor: Aart Adrianus Van Gorkum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2396 days.

(21) Appl. No.: 09/951,864

(22) Filed: Sep. 13, 2001

(65) Prior Publication Data

US 2002/0055882 A1 May 9, 2002

(30) Foreign Application Priority Data

Sep. 13, 2000 (EP) .................................. 00203177

(51) Int. Cl.
*G06Q 30/00* (2006.01)
(52) U.S. Cl. ........................................................ 705/26
(58) Field of Classification Search .................. 705/26, 705/27, 22
See application file for complete search history.

(56) References Cited

U.S. PATENT DOCUMENTS

| | | | | |
|---|---|---|---|---|
| 5,642,485 A | * | 6/1997 | Deaton et al. .................. | 705/14 |
| 5,644,723 A | * | 7/1997 | Deaton et al. .................. | 705/14 |
| 5,649,114 A | * | 7/1997 | Deaton et al. .................. | 705/14 |
| 5,960,411 A | | 9/1999 | Hartman et al. ................ | 705/26 |
| 6,119,099 A | * | 9/2000 | Walker et al. .................. | 705/16 |
| 6,249,774 B1 | * | 6/2001 | Roden et al. ................... | 705/28 |
| 6,625,403 B2 | * | 9/2003 | Carling et al. ................. | 399/24 |
| 6,694,300 B1 | * | 2/2004 | Walker et al. .................. | 705/14 |
| 2002/0113991 A1 | * | 8/2002 | Borg et al. .................. | 358/1.15 |
| 2002/0152139 A1 | * | 10/2002 | Hogan .......................... | 705/28 |
| 2003/0028285 A1 | * | 2/2003 | Zura et al. ................... | 700/241 |
| 2003/0216972 A1 | * | 11/2003 | Gotou et al. ................... | 705/26 |
| 2005/0075954 A1 | * | 4/2005 | Matsumoto et al. ........... | 705/28 |
| 2006/0038010 A1 | * | 2/2006 | Lucas .......................... | 235/385 |
| 2007/0124216 A1 | * | 5/2007 | Lucas .......................... | 705/27 |

FOREIGN PATENT DOCUMENTS

| | | | |
|---|---|---|---|
| JP | 09245234 | * | 9/1997 |
| WO | WO9815909 | | 4/1998 |

OTHER PUBLICATIONS

Electrolux press release, "A refrigerator that thinks", Mar. 17, 1999; pp. 1-2.

* cited by examiner

*Primary Examiner*—Ronald Laneau

(57) ABSTRACT

The invention relates to a method and system (100) for selling an additive (101) for a product (102). Additives are consumer goods which are used in conjunction with another, usually more durable good. The system (100) is notified when a user (130) orders a product (102) for which an additive (101) is available. It then estimates a point in time at which the user's inventory level will be too low, and presents a notification (114) to the user (130). This notification (114) includes an ordering mechanism (116) to order new stock. This system obviates the need for inventory tracking mechanisms and so especially useful for additives.

18 Claims, 1 Drawing Sheet

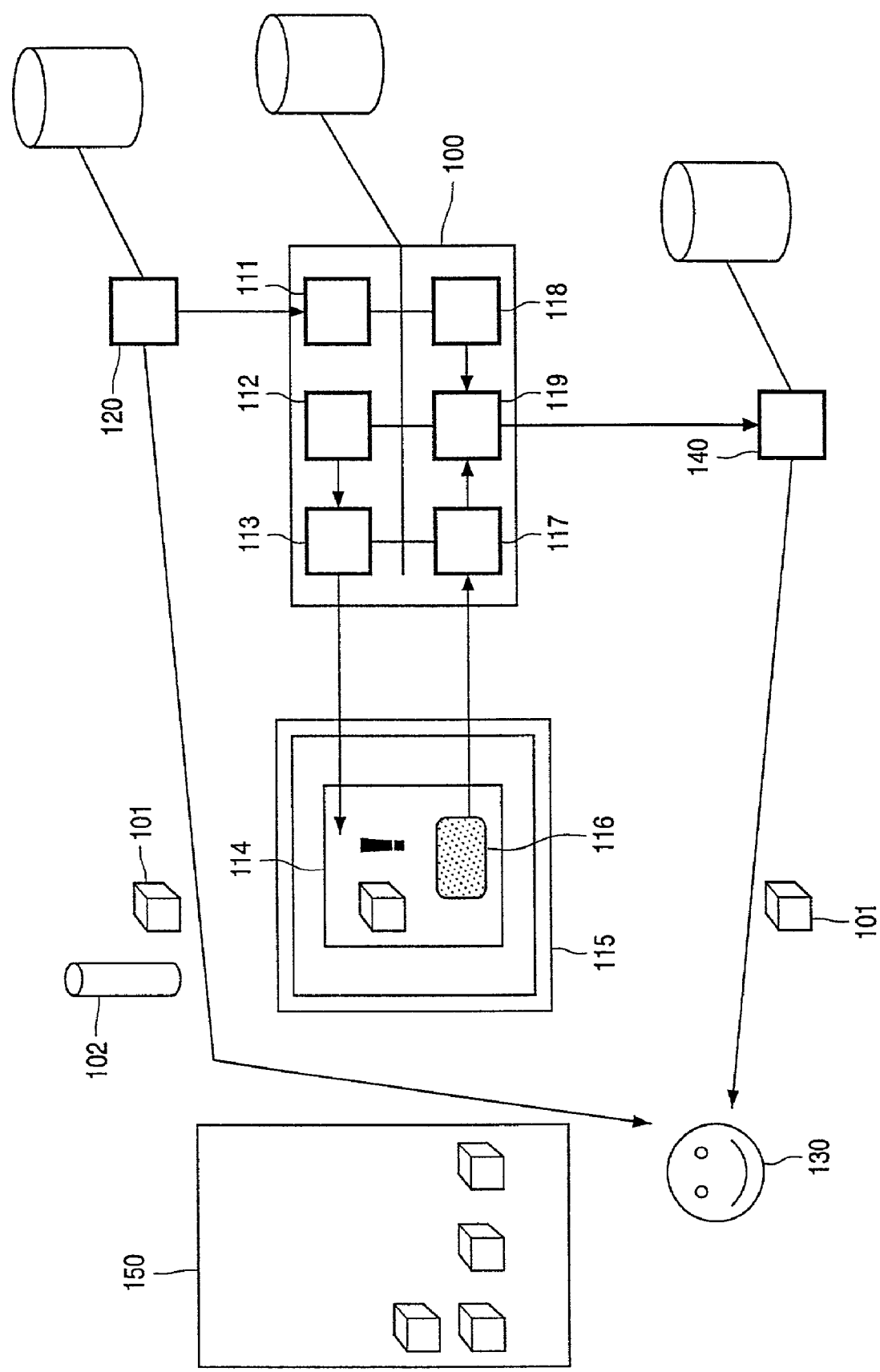

METHOD AND SYSTEM FOR SELLING AN ADDITIVE FOR A PRODUCT

The invention relates to a method of selling an additive for a product.

The invention further relates to a system for selling an additive for a product.

With the advent of powerful computers and Internet connections in the home, inventory control becomes a possibility for consumers. Purchased products are registered with the home inventory control system, and their use can then be tracked. For example, Electrolux sells a "Screenfridge", a refrigerator which keeps track of what someone has in the fridge, and which can help users with grocery shopping and dinner ideas. The Screenfridge looks like a normal refrigerator, but is equipped with a computer and a touch screen on the door. It includes a "reader", which is used to read electronic tags which need to be present on food and liquid packages. This way, the Screenfridge can keep track of the products that are put in and taken out of the refrigerator, and when an inventory level of a product is too low, it can generate a shopping list and put that product on it. Other systems use a barcode reader for the same purpose, requiring the user to actively scan the products they put in or take out.

An increasing number of products such as shavers has been developed with a recurring revenue stream in mind, based on the sale of so-called additives. Additives are consumer goods which are used in conjunction with another, usually more durable good. For example, aftershave is an additive, since it is used in conjunction with a shaver. The replaceable brushes of electrical toothbrushes similarly are additives to the toothbrushes. An important property of additives is that they are used up and need to be replaced more or less regularly, whereas most other products only need to be replaced when they are worn out or become defective. In case the durable good with is of the electrical type, e.g. a shaver, the associated additives are often difficult to sell, since they are closely connected to the original product sold in electrical appliance stores, but end up being sold in drugstores or supermarkets. People tend to forget to buy these additives when they make their shopping lists, since additives are typically stored at a different location in their homes than other goods, which are sold in drugstores and supermarkets.

Systems such as the Screenfridge are not very suitable for keeping track of additives. They need to know the actual inventory level of the products, and require some mechanism to register products being taken out or put in the system. While this may work well for milk cartons that need to be stored in the refrigerator anyway, the procedure is very cumbersome for additives. Since the mentioned electrical appliances are used in a different location, the bathroom, a kitchen-based inventory control system is not very suitable.

It is an object of the invention to provide a method of selling an additive to a product, which is user friendly, easy and simple to use.

This object is achieved in a method which comprises receiving an identifier for a user when the user has bought the product; estimating a point in time when an inventory level of the additive for the product will drop below a predetermined value; and when the estimated point in time has arrived, using the identifier to locate the user, presenting a notification to the user that said inventory level is below the predetermined value, and allowing the user to place an order request for the additive.

E-commerce systems already have the capability of selling any kind of product, and have means to keep track of their users and the products they ordered. Using such data as an input, people who purchased an additive can be tracked. By measuring usage patterns, the point in time when this additive will be used up can be estimated, and the purchaser can then be warned in time. He can then also be offered the opportunity to place an order to restock the additive. Using this method, the user does not need to keep track of the inventory level of his additives, nor does he need to register every amount used with some computer system.

In an embodiment the method further comprises receiving the order request for the additive from the user; using the identifier to obtain additional information about the user; and generating an order for the additive from the received order request and additional information. An advantage of this embodiment is that it is very easy for the user. He only needs to confirm that he wants to replenish the additive, and all other necessary information, such as his name, address and credit card details, are obtained from a database.

In a further embodiment only a single action is performed by the user to place the order request. An advantage of this embodiment is that the user now only needs to simply press a button to have the additive replenished, which makes it easy to use in locations where complex interfaces cannot be offered for technical or aesthetical reasons. For example, the input can be done in the bathroom via e.g. a touchscreen, a button or speech input next to a small screen. When the screen presents the notification, the user only needs to respond very simply by pressing a button or confirming by stating yes, which even works if his hands are covered in soap.

In a further embodiment the point in time is estimated from information on previous order requests for the additive from the user. An advantage of this embodiment is that this makes the estimated point in time more accurate. When the user is notified that the inventory level is low, he might check the actual inventory level and find that this is higher than the estimated level. He can then cancel the order request. The notification should then be presented again at a later time. If the user then orders the additive, then the extra added time should be added to the estimate. The next time the estimate will then be more accurate.

In a further embodiment the point in time is estimated from aggregated information on previous order requests for the additive from multiple users who have bought the product. Usage frequencies may vary too much to allow accurate predictions based on the ordering history of one user, especially when only a few previous order requests were placed. Using aggregated information, more accurate estimates can be made. For example, the average time between order requests can be computed and used as an estimate.

In a further embodiment the notification is presented when the user is in the vicinity of a storage location of the additive. An advantage of this embodiment is that it encourages impulse shopping. The user sees the notification, can easily check the actual inventory level to determine that it is indeed low, and will then be very inclined to place the order request. If the notification is presented at another place, the chance that he will decline to order is higher, as the user might misremember the actual inventory level.

It is a further object of the invention to provide a system for selling an additive to a product, which is user friendly, easy and simple to use.

This object is achieved in a system which comprises receiving means for receiving an identifier for a user when the user has bought the product; estimating means for estimating a point in time when an inventory level of the additive for the product will drop below a predetermined value; and notification means for, when the estimated point in time has arrived, using the identifier to locate the user and for presenting a notification to the user that said inventory level is below the predetermined value, and ordering means for allowing the user to place an order request for the additive.

These and other aspects of the invention will be apparent from and elucidated with reference to the embodiments shown in the drawing, in which:

FIG. 1 schematically shows a system according to the invention.

Throughout the figures, same reference numerals indicate similar or corresponding features. Some of the features indicated in the drawings are typically implemented in software, and as such represent software entities, such as software modules or objects.

FIG. 1 shows a system 100 for selling an additive 101 to a product 102 according to the invention. The system 100 comprises receiver 111, estimator 112 and notifier 113.

When a user 130 buys a product 102 for which an additive 101 is available, the receiver 111 receives an identifier for the user 130. Preferably, the user 130 has bought the product 102 at an e-commerce system 120, so that all necessary information can be shared electronically. If the e-commerce system 120 is maintained by the same entity as the system 100, this sharing becomes very easy. When the user 130 buys the product at a brick-and-mortar store, some extra actions may be necessary to provide the identifier from the store to the receiver 111. The identifier should also identify the product 102 being bought, if more than one product 102 with additives is available at the e-commerce system 120.

When the identifier is received, the estimator 112 makes an estimate of a point in time when an inventory level of the additive 101 for the product 102 will drop below a predetermined value. The predetermined value can and preferably is computed based on the expected usage frequency and amount. It is desirable to replenish additives before their inventory level reaches zero, so that the user is never totally out of stock. Ideally, then, the point in time is estimated such that the delivery of the replenishment coincides with the inventory level reaching zero, i.e. just-in-time delivery. This minimizes the inventory level, which saves shelf space for the user.

The point in time is preferably estimated from information on previous order requests for the additive 101 from the user 130. If this information shows that the user 130 has previously placed orders for the additive 101 every month, then the estimate should be one month from the moment of the latest purchase. Alternatively, the point in time is estimated from aggregated information on previous order requests for the additives from multiple users who have bought the product. Usage frequencies may vary too much to allow accurate predictions based on the ordering history of one user, especially when only a few previous order requests were placed. Using aggregated information, more accurate estimates can be made. For example, the average time between order requests can be computed and used as an estimate. If usage frequency and the amounts used per turn are known, this information can also be used to estimate the point in time. If it is known that the additive 101 is sold in bottles of 100 ml, and the user 130 uses five ml every day, then the inventory level will reach zero after twenty days. Assuming a delivery time of five working days, the estimate of the point in time will be fifteen days after the date at which the additive 101 was last purchased. This information can be used in conjunction with his ordering history. For example, a user may be careful and order in advance, so that a delay in delivery will not cause him to be out of stock. And usage frequencies and amounts used can be aggregated over many users as well.

When the user buys the product 102, it may or may not be sold in conjunction with a first set of additives. The estimate should be adjusted to reflect this possibility. If the product 102 was sold without any additives, the estimated point in time should be in the near future, preferably as soon as possible. This allows the user to order the additive before he first uses the product 102, and also makes him immediately familiar with the system. If a first set of additives is sold with the product 102, the estimated point in time should be estimated based on the amount of additives present in the first set, which may be less than in a normal set.

When the estimated point in time has arrived, the notifier 113 obtains the identifier to locate the user 130. It then generates a notification 114 and presents it to the user 130. This notification 114 informs the user 130 that the inventory level is below the predetermined value. The notification 114 can be presented, for instance, on the user's computer system 115, but also on some other display, for example, a small screen in his bathroom. Presenting the notification 114 when the user is in the vicinity of a storage location 150 of the additive 101 is preferred, as this offers the greatest chance that he will place an order when he sees that the inventory level is indeed low. The notification 114 can also be presented using sound, a combination of pictures and sound, or in some other way which attracts the attention of the user. Alternatively, the notification 114 can be presented on a mobile telephone or other wireless device, for example using the Wireless Application Profile or by sending an SMS message. This obviates the need for having a screen or other output device present in the vicinity of the storage location 150.

When the notification 114 is presented, the user can use an ordering button 116 to place an order request. This ordering button 116 can be a graphical representation which is operated using a mouse, remote control or other input device. It can also be a button on a device which he can select directly. Audio input can also be used as a means for placing the order request.

One such mechanism for placing the order request is known from U.S. Pat No. 5,960,411 to Amazon.com, which discloses a method of placing product. Using this method, a customer is provided with a single-click order request submission mechanism. When the order request is received by a server, the server looks up an identifier provided along with the order to obtain customer information and generates an order. The ordered product or products can then be shipped to the customer in the usual fashion.

When the user 130 is notified that the inventory level is low, he might check the actual inventory level and find that this is higher than the estimated level. He can then cancel the order request. The notification should then be presented again at a later time. If the user 130 then orders the additive 101, then the extra added time should be added to the estimate. The next time the estimate will then be more accurate.

In an alternative embodiment, the system 100 further comprises an order request receiver 117, which receives the order request for the additive 101 from the user, when the user presses the button 116. When this happens, an identification module 118 looks up additional information about the user 130 using the identifier which was provided earlier to the system 100 using the receiver 111. An order generation module 119 combines the order request and the additional information and generates an order. This order is then submitted to a warehouse 140, which processes the order and makes the delivery of the additive 101 to the user.

The invention claimed is:

1. A method of selling an additive for a product, comprising the steps of:

executing the following operations in a data processing device;

receiving an identifier for a user when the user has bought the product;

estimating a point in time when an inventory level of the additive for the product will drop below a predetermined value;

when the estimated point in time has arrived, using the identifier to locate and contact the user;

presenting a notification to the user that the inventory level is below the predetermined value; and allowing the user to place an order request for the additive.

2. The method of claim I, wherein the operations further comprise:

receiving the order request for the additive from the user;

using the identifier to obtain additional information about the user ; and generating an order for the additive from the received order request and additional information.

3. The method of claim 1, wherein only a single action is performed by the user to place the order request.

4. The method of claim 1, wherein the point in time is estimated from information on previous order requests for the additive from the user.

5. The method of claim 1, wherein the point in time is estimated from aggregated information on previous order requests for the additive from multiple users who have bought the product.

6. The method of claim 1, wherein the notification is presented when the user is in the vicinity of a storage location of the additive.

7. A system for selling an additive for a product, comprising:

receiving means for receiving an identifier for a user when the user has bought the product ;

estimating means for estimating a point in time when an inventory level of the additive for the product will drop below a predetermined value; and notification means for, when the estimated point in time has arrived, using the identifier to locate the user and for presenting a notification to the user that said inventory level is below the predetermined value; and ordering means for allowing the user to place an order request for the additive.

8. The system of claim 7, further comprising order request reception means for receiving the order request for the additive from the user , and identification means for obtaining additional information about the user , using the identifier, coupled to order generation means for generating and order for the additive from the received order request and the additional information.

9. The system of claim 7, wherein the estimating means is arranged to estimate the point in time from information on previous order requests for the additive from the user.

10. The system of claim 7, wherein the notification is presented when the user is in the vicinity of a location associated with a storage of the additive.

11. The system of claim 7, wherein the estimating means is configured to use knowledge about the additive being necessary to use with the product.

12. The method of claim 1, wherein the estimating of the point in time comprises making use of knowledge about the additive being necessary to use with the product.

13. A non-transitory medium readable by at least one data processing device and embodying code for causing the data processing device to perform operations, the operations comprising:

receiving an identifier for a user when the user has bought the product;

estimating a point in time when an inventory level of an additive for the product will drop below a predetermined value; and contacting the user when the estimated point in time has arrived by using the identifier;

presenting a notification to the user that said inventory level is below the predetermined value; and allowing the user to place an order request for the additive.

14. The non-transitory medium of claim 13, wherein the operations further comprise:

receiving the order request for the additive from the user ;

using the identifier to obtain additional information about the user ; and generating an order for the additive from the received order request and additional information.

15. The non-transitory medium of claim 13, wherein the point in time is estimated from information on previous order requests for the additive from the user.

16. The non-transitory medium of claim 13, wherein the point in time is estimated from aggregated information on previous order requests for the additive from multiple users who have bought the product.

17. The non-transitory medium of claim 13, wherein the notification is presented when the user is in a vicinity of a storage location of the additive.

18. The non-transitory medium of claim 13, wherein the estimating of the point in time comprises making use of knowledge about the additive being necessary to use with the product.

\* \* \* \* \*